US009710283B2

(12) United States Patent
He et al.

(10) Patent No.: US 9,710,283 B2
(45) Date of Patent: Jul. 18, 2017

(54) SYSTEM AND METHOD FOR PRE-STORING SMALL DATA FILES INTO A PAGE-CACHE AND PERFORMING READING AND WRITING TO THE PAGE CACHE DURING BOOTING

(71) Applicant: MStar Semiconductor, Inc., Hsinchu Hsien (TW)

(72) Inventors: Hong-Bo He, Shanghai (CN); Ming-Yong Sun, Shanghai (CN)

(73) Assignee: MStar Semiconductor, Inc., Hsinchu Hsien (TW)

( * ) Notice: Subject to any disclaimer, the term of this patent is extended or adjusted under 35 U.S.C. 154(b) by 111 days.

(21) Appl. No.: 14/751,223

(22) Filed: Jun. 26, 2015

(65) Prior Publication Data

US 2015/0378745 A1 Dec. 31, 2015

(30) Foreign Application Priority Data

Jun. 26, 2014 (CN) .......................... 2014 1 0298614

(51) Int. Cl.
| | | |
|---|---|---|
| *G06F 9/44* | (2006.01) | |
| *G06F 12/0862* | (2016.01) | |
| *G06F 9/30* | (2006.01) | |

(52) U.S. Cl.
CPC ........ *G06F 9/4401* (2013.01); *G06F 9/30047* (2013.01); *G06F 12/0862* (2013.01); *G06F 2212/6026* (2013.01)

(58) Field of Classification Search
CPC ......... G06F 9/4401; G06F 9/4411; G06F 9/24
USPC .......................................................... 713/2
See application file for complete search history.

(56) References Cited

U.S. PATENT DOCUMENTS

| | | | | |
|---|---|---|---|---|
| 8,914,579 B2* | 12/2014 | Maeda | ............... | G06F 12/0246 711/118 |
| 2001/0013087 A1* | 8/2001 | Ronstrom | ............. | G06F 12/122 711/133 |
| 2002/0124135 A1* | 9/2002 | Newman | ............ | G06F 12/0866 711/113 |
| 2003/0005223 A1* | 1/2003 | Coulson | ............... | G06F 9/4401 711/118 |

(Continued)

FOREIGN PATENT DOCUMENTS

CN 101814038 A 8/2010

OTHER PUBLICATIONS

SIPO Office Action, Dec. 22, 2016, 8 pages.

*Primary Examiner* — Thomas Lee
*Assistant Examiner* — Santosh R Poudel
(74) *Attorney, Agent, or Firm* — Edell, Shapiro & Finnan, LLC

(57) ABSTRACT

A data processing method during a boot procedure of a smart device is provided. The data processing method includes: when a data request is detected during the boot procedure of the smart device, looking up whether a page cache pre-storing a small data file required for booting includes requested data of the data request, the small data file being file having a data amount smaller than a predetermined threshold; when the page cache includes the requested data, determining whether the data request is a data reading request or a data writing request; when the data request is the data reading request, duplicating the requested from the page cache to a system memory according to the data request. A boot time can be reduced through the above method.

16 Claims, 5 Drawing Sheets

(56) References Cited

U.S. PATENT DOCUMENTS

| | | | |
|---|---|---|---|
| 2003/0188121 A1* | 10/2003 | Roy | G06F 12/023 711/171 |
| 2008/0162795 A1* | 7/2008 | Hsieh | G06F 12/0866 711/103 |
| 2009/0235023 A1* | 9/2009 | Manoj | G06F 12/0868 711/114 |
| 2010/0332717 A1* | 12/2010 | Maeda | G06F 12/0246 711/3 |
| 2014/0082341 A1* | 3/2014 | Lin | G06F 9/442 713/2 |
| 2014/0337609 A1* | 11/2014 | Steele | G06F 9/4401 713/2 |
| 2015/0067258 A1* | 3/2015 | Jung | G06F 12/0868 711/119 |

* cited by examiner

SYSTEM AND METHOD FOR PRE-STORING SMALL DATA FILES INTO A PAGE-CACHE AND PERFORMING READING AND WRITING TO THE PAGE CACHE DURING BOOTING

This application claims the benefit of People's Republic of China application Serial No. 201410298614.2, filed Jun. 26, 2014, the subject matter of which is incorporated herein by reference.

BACKGROUND OF THE INVENTION

Field of the Invention

The invention relates in general to a data processing method during a boot procedure of a smart device and a smart device.

Description of the Related Art

With the ever-increasing number of functions supported by smart devices, software in the smart devices also becomes more and more complicated, resulting in longer and longer boot times. Due to a larger system, more data needs to be fetched from a memory during a boot procedure, and such frequent visits to external memories inevitably increase the boot time of the system.

Data of large files that need to be accessed during a boot procedure is already pre-loaded by a pre-loading method provided by the file system. After an upper layer reads previous several sets of data, the file system automatically reads subsequent data to perform data processing of a processor and data access from an external memory in a parallel manner, thereby reducing the number of visits to the external memory affecting the boot time during the boot procedure and further enhancing the overall system performance. However, the pre-loading of the file system is performed individually in the files and cannot be performed in traverse for different files. As a result, the pre-loading can only leave a large amount of small files (less than 4K bytes) unattended during the boot procedure.

Therefore, there is a need for a data processing method during a boot procedure of a smart device to solve the slow system boot speed.

SUMMARY OF THE INVENTION

The invention is directed to a data processing method during a boot procedure of a smart device capable of reducing a boot time.

A data processing method during a boot procedure of a smart device is provided by the present invention. The data processing method includes: when a data request is detected during the boot procedure of the smart device, looking up whether a page cache that pre-stores a small data file required for booting includes requested data of the data request, the small data file being file having a data amount smaller than a predetermined threshold; when the page cache includes the requested data, determining whether the data request is a data reading request or a data writing request; when the data request is the data reading request, duplicating the requested from the page cache to a system memory according to the data request.

A smart device is further provided by the present invention. The smart device includes a look-up module, a determination module, and a processing module. When a data request is detected during a boot process of the smart device, the look-up module looks up whether a page cache that pre-stores a small data file required for booting includes requested data of the data request, wherein the small data file is file having a data amount smaller than a predetermined threshold. When the page cache includes the requested data, the determination module determines whether the data request is a data reading request or a data writing request. When the determination module determines that data request is the data reading request, the processing module duplicates the requested from the page cache to a system memory according to the data request.

The present invention provides following features compared to the prior art. In the present invention, when requested data required for booting needs to be accessed, a page cache pre-storing small data files is first looked up, and the requested data is obtained from the page cache if the requested data is identified. Through the above method, the access of small data files during a boot procedure of a smart device can be sped up to accelerate the system boot speed.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
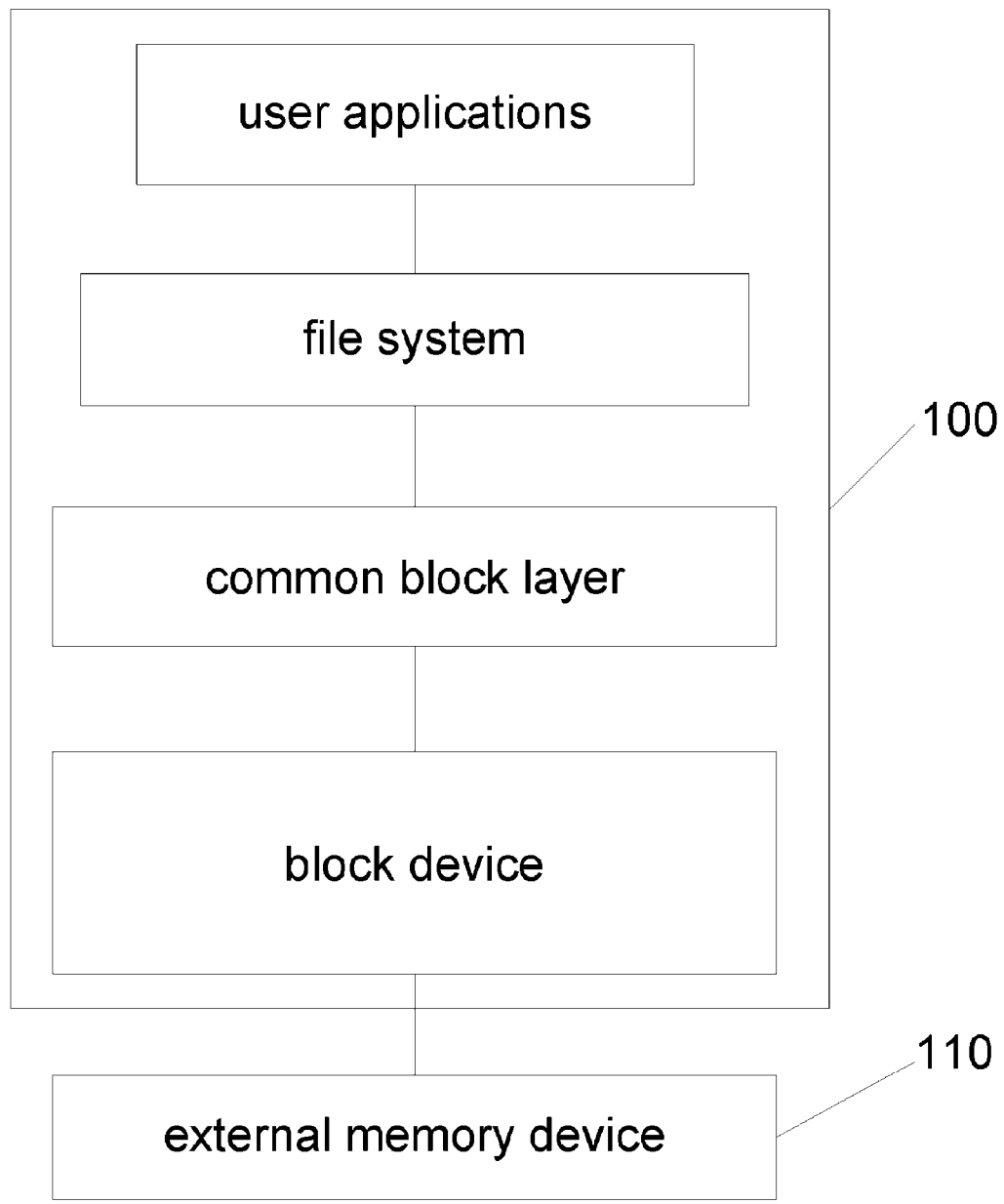
FIG. 1 is a schematic diagram of a data processing system of the present invention.

A brief description of a data processing system implemented in the present invention is first given below. FIG. 1 shows a schematic diagram of a data processing system in a boot procedure of a smart device of the present invention. Such data processing system includes a smart device 100 and an external memory 110. The smart device 100 includes user applications, a file system, a common block layer and a block device. When the file system needs data, a data request is sent to the common block layer and is constructed to a data reading/writing request at the common block layer. The data reading/writing request is placed to a target device (i.e., the block device in FIG. 1) according to a predetermined rule. The data processing system during a boot procedure of a smart device of the present invention is implemented to a block device in a system processing system. As such, implementation details and parameters may be adjusted according to different physical devices to achieve optimal performance.

For example, the external memory may be an embedded MultiMediaCard (EMMC). Table-1 shows access performance analysis of the present invention for several main stream commercial EMMC products. It is seen from Table-1 that, as the access unit increases, the speed increases direct proportionally, and such relationship continues for larger access units such as 16K or 32K. That is to say, the time needed for accessing 4 KB data is the same as the time needed for accessing 16 KB data. Thus, when the file system needs data in small blocks, the block device is allowed to read more data and pre-store the data in advance without increasing the time.

TABLE 1

Access performance analysis table of EMMC products

| Access unit | Access speed (KB/S) | | | |
|---|---|---|---|---|
| (KB) | Toshiba | Micron | Samsung | Kingston |
| 1 | 341 | 84 | 336 | 294 |
| 2 | 682 | 166 | 671 | 579 |
| 4 | 1365 | 332 | 1339 | 998 |
| 8 | 2730 | 648 | 2037 | 1771 |
| 16 | 5461 | 1232 | 4069 | 3666 |
| 32 | 8192 | 2408 | 8121 | 5592 |
| 64 | 13107 | 4308 | 10867 | 8208 |
| 128 | 18724 | 7483 | 16215 | 9921 |
| 256 | 23831 | 11943 | 21226 | 11454 |
| 512 | 25890 | 16240 | 24634 | 13220 |

Figure 2:
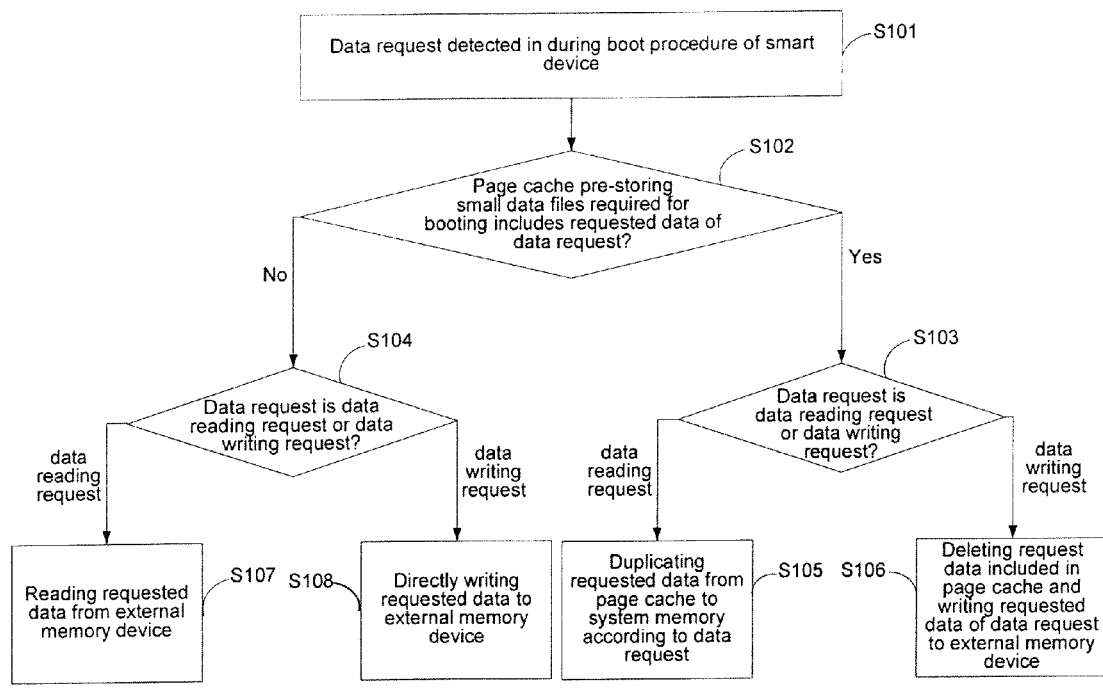
FIG. 2 is a flowchart of a data processing method during a boot procedure of a smart device according to an embodiment of the present invention.

FIG. 2 shows a flowchart of a data processing method during a boot procedure of a smart device according to an embodiment of the present invention. According to the embodiment, the data processing method during a boot procedure of a smart device includes following steps.

In step S101, a data request is detected in the boot procedure of the smart device.

Figure 3:
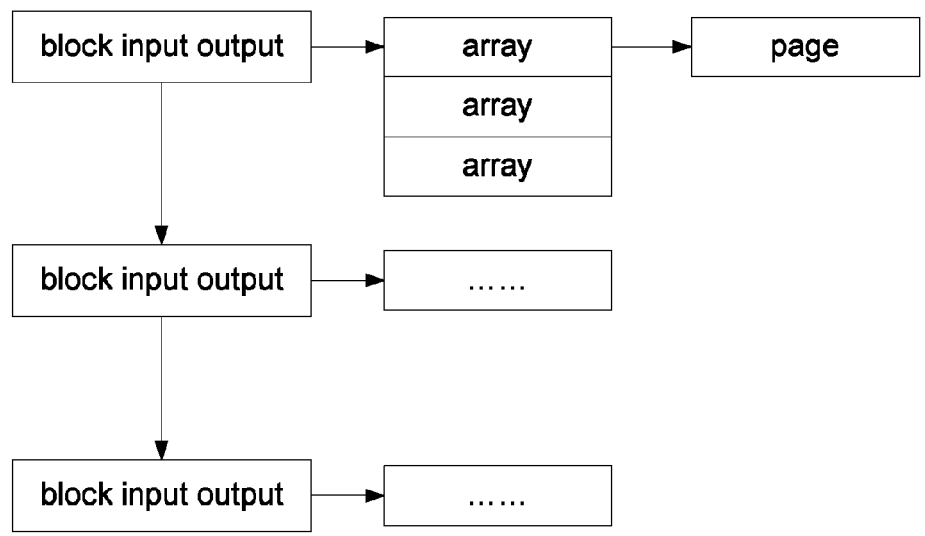
FIG. 3 is a schematic diagram of a data request in a data processing method during a boot procedure of a smart device according to an embodiment of the present invention.

A data request is detected in the boot procedure of the smart device. FIG. 3 shows a data structure of a data request according to an embodiment of the present invention. As shown in FIG. 3, each data request is formed by a plurality of block input outputs (BIOs), each of the BIOs is formed by a plurality of structure bodies (bio_vec) and sectors, and each structure body bio_vec includes one page corresponding to a virtual address of a system memory and each sector corresponds to a physical address of an external memory. For example, when the data request is a data reading request comprising a bio_vec of page0 and a sector sector0, it means that the requested data is read from the external memory at the physical address corresponding to sector1 or from a page of the page cache storing the information sector1, and is duplicated to the system memory at a virtual address corresponding to page0. It is to be noted that, the requested data is consecutively read from the external device, e.g., sector0, sector1, sector2 . . . , so as to raise the read speed. Since the situations are similar when the data request is a data writing request, it shall not be described again for brevity purposes.

The data processing method during a boot procedure of a smart device according to an embodiment of the present invention may further include a step of pre-storing small data files required for booting in the page cache. That is, small data files required for booting are obtained, and are consecutively stored into the page cache. The small data files are files having a data amount smaller than a predetermined threshold. More specifically, the small data files are stored in form of pages into the page cache, and all of the stored pages are managed in form of a radix tree in the page cache.

Taking an Android smart television for example, a file system "ext4" of the Android smart television may obtain small data files required for booting through the method below. An open file function corresponding to the file system is modified, the opened file is filtered out according to the size and file name, and data files smaller than a predetermined threshold filtered out are small data files required for booting. A code of a scan directory in the Android file system is then modified, such that the file system is prioritized to process the small data files required for booting. Thus, these small data files are consecutively placed together, so as to increase the hit rate of identifying the requested data from the page cache.

Figure 4:
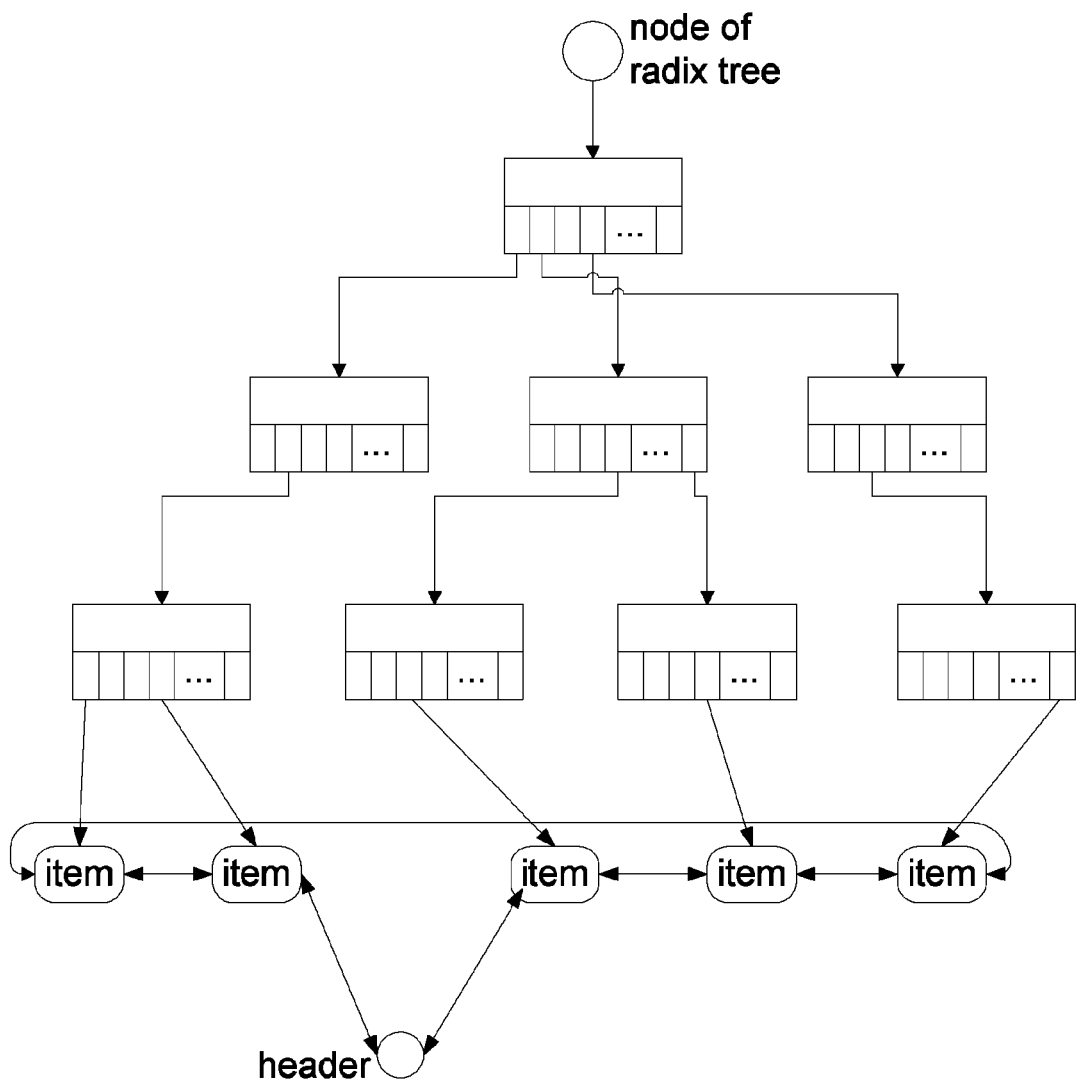
FIG. 4 is a diagram of a radix tree of a page cache in a data processing method during a boot procedure of a smart device according to an embodiment of the present invention.

That is to say, the small data files required for booting and needing to be pre-read are stored in a radix tree in form of pages (as shown in FIG. 4). A main key value corresponding to the page is the block number of the stored block. As the radix tree is a multiple search tree, an index of a corresponding page in the page cache can be immediately obtained when the key value is provided, or else an empty index is returned if not.

Four sets of operations are provided for operations of the radix tree according to the embodiment—enquiring whether a single page exists in the page cache, enquiring whether an $N^{th}$ page starting from a predetermined block number exists in the page cache, adding one page into the page cache, and removing a specific page from the page cache.

To retrieve pages from the page cache, while constructing the page cache, all of the pages in the page cache are connected to a bidirectional chain list. For example, a chain list head "struct list_head lru" in the page data structure is used to connect the pages to the bidirectional chain list. Operations of this bidirectional chain list are applied to three scenarios—when a new page is added to the radix tree, these pages needs to be simultaneously added to the end of the bidirectional chain list; when deleting a page from the radix tree, the corresponding page needs to be removed from the bidirectional chain list; and when the system memory is tight, a release function memory shrinker registered is called. The memory shrinker in the present invention starts from the header of the bidirectional chain table. To release pages in an appointed quantity, the system appoints this parameter when calling the release function, and the corresponding pages in the radix tree also needs to be simultaneously deleted.

As the bidirectional chain list may be simultaneously operated by two different processes, the bidirectional chain list may be protected by a mutex. The initialization of the radix tree and the bidirectional chain list as well as the registration of the release function are completed when the system initializes the external memory.

When the system memory is insufficient, the release function may be called to release pages in an appointed quantity from the page cache. The page of appointed data is a page of appointed data from the header of the bidirectional chain list. More specifically, when the memory is tight, the chain list of the page cache is traversed, and a certain quantity of pages are released starting from the header of the chain list to the system.

In step S102, it is looked up whether the page cache pre-storing the small data files required for booting includes requested data of the data request.

For the data request, the smart device first looks up the requested data of the data request in the page cache. The page cache pre-stores the small data files required for booting. The small data files are files having a data amount smaller than a predetermined threshold. The predetermined threshold may be set according to actual requirements. In the embodiment of the present invention, the predetermined threshold is set to 16K.

It is looked up whether the page cache includes the requested data of the data request, and step S103 is performed if so, or else step S104 is performed if not.

In step S103, it is determined whether the data request is a data reading request or a data writing request.

When the page cache includes the requested data of the data request, it is further determined whether the data request is a data reading request or a data writing request. When the data request is a data reading request, step S105 is performed; when the data request is a data writing request, step S106 is performed.

In step S105, the requested data is duplicated from the page cache to a system memory according to the data request.

When the page cache includes the requested data of the data request and the data request is a data reading request, the requested data is duplicated from the page cache to the system memory according to the data request.

The process of duplicating the requested data from the page cache to the system memory according to the data request is categorized into two situations.

In the first situation, when the page cache includes all requested data of the data request, the requested data is directly duplicated from the page cache to the system memory according to the data request.

In the second situation, when the page cache includes a part of the requested data of the data request, actual conditions of the part of data included in the page cache are further determined. When the part of data included in the page cache comprises a consecutive section of data at the beginning of the requested data or a consecutive section of data at the end of the requested data of the data request, the part of data included is duplicated to the system memory according to the data request and the part of data not included is read from the external memory. When the part of data included in the page cache comprises a middle section or fragments of the requested data of the data request, the part of data included in the page cache is directly deleted, and the requested data is read from the external memory.

For the second situation, it is in practice analyzing the position of the part of data identified in the data request and then determining a subsequent process, and the part of data identified is only processed when it is a part at the beginning or the end of the corresponding pages of the data request. For example, when the part of data identified is several consecutive pages starting from the $0^{th}$ page (page 0) or several consecutive pages counting backwards from the last $n^{th}$ page (page n) of the data request, the part of data identified is duplicated to the corresponding pages of the data request and returned to an upper-layer applications. When the part of data identified is several consecutive pages or scattered pages (i.e., excluding page 0 and page n) at the middle of the data request, this part of data is directly deleted from the page cache. Because if the middle pages are duplicated to the corresponding pages of the data request and returned, when the remaining part of data is read from the external memory, at least two accesses need to be performed for data at the beginning and the end, and performance may be degraded instead of being faster than performing one consecutive access operation.

Implementation details of reading the requested data from the external memory are as follows. It is first determined whether the amount of data to be read from the external memory is smaller than the predetermined threshold. When the amount of data to be read is smaller than the predetermined threshold, the data in an amount as the predetermined threshold is read from the external memory, the requested data is duplicated from the read data in the amount as the predetermined threshold to the data request and returned, and the remaining data is added to the page cache. When the amount of requested data is greater than the predetermined threshold, the requested data is directly read from the external memory and duplicated to the data request, and the data request is returned.

For example, in the embodiment, the predetermined threshold is set to 16 KB. When the data to be read from the external memory is greater than or equal to 16 KB, the data is directly read from the external memory. When the data to be read from the external memory is smaller than 16 KB, 16 KB data is read from the external memory, and the requested data in the 16 KB data is duplicated to the corresponding pages of the data request and returned to an upper layer. For the remaining part of data that is read in excess, a page is applied from an operating system kernel, the remaining data is duplicated to the page, and the page is then added into the page cache.

In step S106, the requested data included in the page cache is deleted, and the requested data of the data request is written to the external memory.

When the page cache includes the request data of the data request and the data request is a data writing request, the requested data included in the page cache is deleted, and the requested data of the data request is written to the external memory.

In step S104, it is determined whether the data request is a data reading request or a data writing request.

When the page cache does not include the requested data of the data request, it is further determined whether the data request is a data reading request or a data writing request. Step S107 is performed when the data request is a data reading request, or step S106 is performed when the data request is a data writing request.

In step S107, the requested data is read from the external memory.

When the page cache does not include the requested data of the data request and the data request is a data reading request, the requested data of the data request is read from the external memory. Details for reading the requested data of the data request from the external memory are same as described above, and shall be omitted herein.

In step S108, the requested data is directly written into the external memory.

When the page cache does not include the requested data of the data request and the data request is a data reading request, the requested data of the data request is directly written into the external memory.

In the examples and description of the embodiment of the present invention, a smart television is given as an example and is not to be construed as a limitation of the present invention. In practice, the data processing method of the present invention may be applied to other smart devices such as laptop computers and tablet computers.

It is understood from the embodiments described above that, in the present invention, when requested data required for booting needs to be accessed, a page cache pre-storing small data files is first looked up, and the requested data is obtained from the page cache if the requested data is identified. Through the above method, the access of small data files during a boot procedure of a smart device can be sped up to accelerate the system boot speed.

Further, one person skilled in the art can understand from the description of the above embodiments that, the present invention may be implemented through software incorporating a necessary universal hardware platform or through software. In many situations, the former is a preferred method. Based on such understanding, the essential part of or a part contributed by the technical solution of the present invention for current technologies may be presented in form of a software product. The computer software product is stored in a storage medium, and includes a plurality of instructions for prompting a computer device (e.g., a person computer, a server or a network device) to perform all or a part of the steps of the method of the embodiments of the present invention. For example, the storage medium includes a read-only memory (ROM), a random access memory (RAM), a drive or a disk capable of storing program codes.

Figure 5:
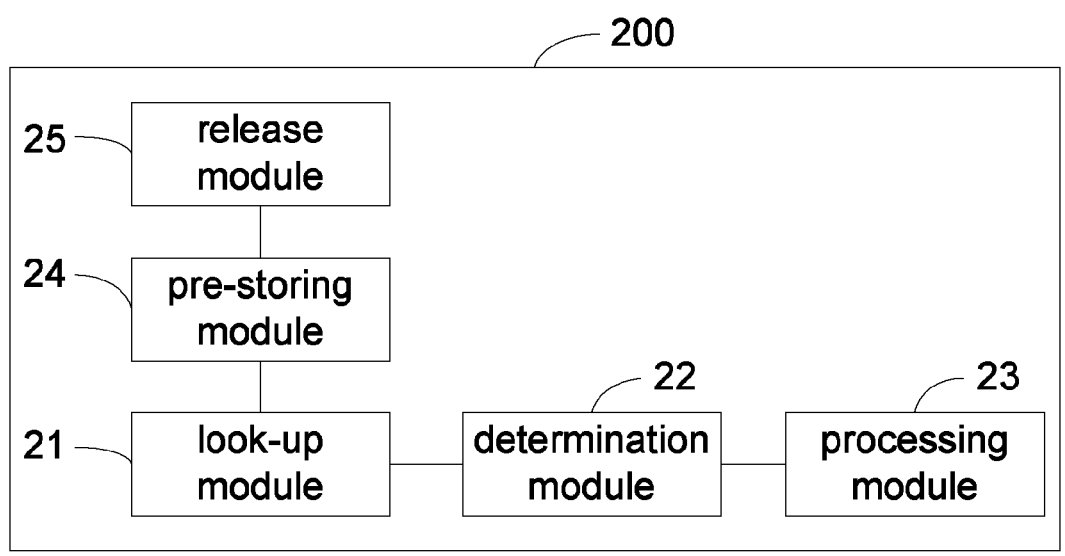
FIG. 5 is a schematic diagram of a smart device according to an embodiment of the present invention.

FIG. 5 shows a schematic diagram of a smart device according to an embodiment of the present invention. A smart device 200 of the embodiment includes a look-up module 21, a determination module 22, and a processing module 23.

When a data request is detected in a boot procedure of the smart device, the look-up table 21 looks up whether a page cache pre-storing small data files includes requested data of the data request. The small data files are files having a data amount smaller than a predetermined threshold.

A data request is detected in a boot procedure of a smart device. For the data request, the look-up module 21 first looks up requested data of the data request from a page cache. The page cache pre-stores small data files required for booting. The small data files are files having a data amount smaller than a predetermined threshold. The predetermined threshold may be determined according to actual requirements, and is 16K for example in the embodiment.

When the look-up module 21 identifies the requested data of the data request in the page cache, the determination module 22 determines whether the data request is a data reading request or a data writing request.

When the look-up module 21 identifies the requested data of the data request in the page cache, the determination module 22 further determines whether the data request is a data reading request or a data writing request, and sends a determination result to the processing module 23.

When the determination module 22 determines that the data request is a data reading request, the processing module 23 duplicates the requested data from the page cache to corresponding pages of the data request and returns the data request.

When the page cache includes the requested data of the data request and the data request is a data reading request, the processing module 23 duplicates the requested data from the page cache and returns the data request.

The process of duplicating the requested data from the page cache to the corresponding pages of the data request and returning the data request is categorized into two situations.

In the first situation, when the page cache includes all requested data of the data request, the processing module 23 directly duplicates the requested data from the page cache to the corresponding pages of the data request and returns the data request.

In the second situation, when the page cache includes a part of the requested data of the data request, actual conditions of the part of data included in the page cache are further determined. When the part of data included in the page cache comprises a consecutive section of data at the beginning of the requested data or a consecutive section of data at the end of the requested data of the data request, the processing module 23 duplicates the part of data included to the data request and reads the part of data not included from the external memory. When the part of data included in the page cache comprises a middle section or fragments of the requested data of the data request, the processing module 23 directly deletes the part of data included in the page cache, and reads the data of the data request from the external memory.

For the second situation, it is in practice analyzing the position of the part of data identified in the data request and then determining a subsequent process, and the part of data identified is only processed when it is a part at the beginning or the end of the pages of the data request. For example, when the part of data identified is several consecutive pages starting from the $0^{th}$ page (page 0) or several consecutive pages counting backwards from the last $n^{th}$ page (page n) of the data request, the part of data identified is duplicated to the corresponding pages of the data request and returned to an upper layer. When the part of data identified is several consecutive pages or scattered pages (i.e., excluding page 0 and page n) at the middle of the data request, this part of data is directly deleted from the page cache. Because if the middle pages are duplicated to the corresponding pages of the data request and returned, when the remaining part of data is read from the external memory, at least two accesses need to be performed for data at the beginning and the end, and performance may be degraded instead of being faster than performing one consecutive access operation.

Implementation details of how the processing module 23 reads the requested data from the external memory are as follows. The determination module 22 first determines whether the amount of data to be read from the external memory is smaller than the predetermined threshold. When the amount of data to be read is smaller than the predetermined threshold, the processing module 23 reads the data in an amount as the predetermined threshold from the external memory, duplicates the requested data from the read data to the corresponding pages of the data request, returns the data request, and adds the remaining data to the page cache. When the amount of requested data is greater than the predetermined threshold, the processing module 23 directly duplicates the requested data from the external memory to the corresponding pages of the data request and returns the data request.

For example, in the embodiment, the predetermined threshold is set to 16 KB. When the data to be read from the external memory is greater than or equal to 16 KB, the data is directly read from the external memory. When the data to be read from the external memory is smaller than 16 KB, 16 KB data is read from the external memory, and the requested data in the 16 KB data is duplicated to the corresponding pages of the data request and returned to an upper layer. For the remaining part of data that is read in excess, a page is applied from an operating system kernel, the remaining data is duplicated to the page, and the page is then added into the page cache.

When the page cache does not include the requested data and the data request is a data reading request, the processing module 23 reads the requested data from the external memory.

When the page cache does not include the requested data of the data request and the data request is a data reading request, the processing module 23 reads the requested data of the data request from the external memory. Details for reading the requested data of the data request from the external memory are same as described above, and shall be omitted herein.

When the page cache includes the request data of the data request and the data request is a data writing request, the processing module 23 deletes the requested data included in the page cache, and writes the requested data of the data request to the external memory. Alternatively, when the page cache does not include the requested data and the data request is a data writing request, the processing module 23 directly writes the requested to the external memory.

When the page cache includes the request data of the data request and the data request is a data writing request, the processing module 23 deletes the requested data included in the page cache, and writes the requested data of the data request to the external memory.

When the page cache does not include the requested data and the data request is a data writing request, the processing module 23 directly writes the requested data to the external memory.

Referring to FIG. 5, a smart device 200 in another possible embodiment of the present invention further includes a pre-storing module 24. The pre-storing module 24 obtains small data files require for booting, and consecutively stores the small data files to the page cache.

More specifically, the pre-storing module 24 stores the small data files in form of pages in the page cache, and manages and stores the pages stored in the page cache in form of a radix tree. Further, the pre-storing module 24 connects all the pages in the page cache to a bidirectional chain list.

Taking an Android smart television for example, a file system "ext4" of the Android smart television may obtain small data files required for booting through the method below. An open file function corresponding to the file system is modified, the opened file is filtered out according to the size and file name, and data files smaller than a predetermined threshold filtered out are small data files required for booting. A code of a scan directory in the Android file system is then modified, such that the file system is prioritized to process the small data files required for booting. Thus, these small data files are consecutively placed together, so as to increase the hit rate of identifying the requested data from the page cache.

That is to say, the small data files required for booting and needing to be pre-read are stored in form of pages in a radix tree (as shown in FIG. 4). A main key value corresponding to the page is the block number of the store block. As the radix tree is a multiple search tree, an index of a corresponding page in the page cache can be immediately obtained given the key value, or else an empty index is returned if not.

Four sets of operations are provided for operations of the radix tree according to the embodiment—enquiring whether a single page exists in the page cache, enquiring whether an $N^{th}$ page starting from a predetermined number exists in the page cache, adding one page into the page cache, and removing a specific page from the page cache.

To retrieve pages in the page cache, while constructing the page cache, all pages in the page cache are connected to a bidirectional chain list. For example, a chain list head "struct list_head lru" in the page data structure is used to connect pages into the bidirectional chain list. Operations of this bidirectional chain list are applied to three scenarios—when a new page is added to the radix tree, these pages needs to be simultaneously added to the end of the bidirectional chain list; when deleting a page from the radix tree, the corresponding page needs to be removed from the bidirectional chain list; and when the system memory is tight, a release function memory shrinker registered is called. The memory shrinker in the present invention starts from the header of the bidirectional chain table. To release pages of an appointed quantity, the system appoints this parameter when calling the release function, and the corresponding page in the radix tree also needs to be simultaneously deleted.

As the bidirectional chain list may be simultaneously operated by two different processes, the bidirectional chain list may be protected by a mutex. The initialization of the radix tree and the bidirectional chain list as well as the registration of the release function are completed when the system initializes the external memory.

Further, referring to FIG. 5, a smart device 200 in another possible embodiment of the present invention may further include a release module 25. When the system memory is insufficient, the release module 25 calls the release function to cause the page cache to release pages in an appointed quantity from the page cache.

More specifically, the release module 25 calls the release function to cause the page cache to delete pages in an appointed quantity from the bidirectional chain list, and to delete the pages of the appointed number from the radix tree.

A data processing method during a boot procedure of a smart device and a smart device according to embodiments of the present invention are as disclosed above. It is understood that, in the present invention, when requested data required for booting to be accessed, a page cache pre-storing small data files is first looked up, and the requested data is obtained from the page cache if the requested data is identified. The method is also applicable to a situation where data needs to be written in a boot procedure. When the page cache includes the data to be written, the corresponding page in the page cache is directly deleted, and the data is directly written to the external memory. Through the above method, the access of small data files during a boot procedure of a smart device can be sped up to accelerate the system boot speed, thereby solving the issue of a slow boot speed caused by expanding software.

In the embodiments of the present invention, it can be understood that, the device and method disclosed can be implemented by other approaches. For example, the described implementation details of the device are illustrative. For example, the modules or units are functionally divided, and there are other dividing methods. For example, multiple units or elements may be combined or integrated to another system, or certain characteristics may be omitted or unexecuted. Further, the indirect or direct coupling of communication connection discussed may be achieved through certain interfaces, and may be electrical, mechanical or other forms.

The units described as discrete parts may or may not be physically separate. The components displayed as units may or may not be physical units, i.e., these components may be located at a same location or may be distributed to multiple network units. The objects of embodiments of the present invention may be implemented by a part or all of the units according to actual requirements.

Further, the function units in the embodiments of the present invention may be integrated into one processing unit, or may be physically independently present. Alternatively, two or more of these units may be integrated into one unit. The integrated unit may be implemented in form of hardware or in form of a software function unit. A person having ordinary skills in the art should know that the function units in the embodiments of the present invention may be implemented by a general-purpose computer associated with software to perform the abovementioned functions.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data processing method during a boot procedure of a smart device, comprising:
    when a data request is detected in the boot procedure of the smart device, looking up whether a page cache pre-storing a small data file required for booting includes requested data of the data request, the small data file being a file having a data amount smaller than a predetermined threshold;
    when the page cache includes the requested data of the data request, determining whether the data request is a data reading request or a data writing request; and
    when the data request is the data reading request, duplicating the requested data from the page cache to a system memory according to the data request,
    wherein duplicating the requested data to the system memory according to the data request comprises:
    when the page cache includes a part of data of the requested data, if the part of data included in the page cache comprises a beginning section of data of the requested data or an ending section of data of the requested data of the data request, duplicating the part of data included to the data request, and reading a part of data of the requested data not included from an external memory; if the part of data included in the page cache comprises a middle section or fragments of the requested data of the data request, directly deleting the part of data included in the page cache, and reading the requested data from the external memory; when the page cache does not include the requested data and the data request is the data reading request, reading the requested data from an external memory.

2. The data processing method according to claim 1, further comprising:
    obtaining the small data file required for booting, and consecutively storing the small data file into the page cache.

3. The data processing method according to claim 2, wherein the step of consecutively storing the small data file into the page cache comprises:
    storing the small data file in form of pages into the page cache, and managing all pages stored in the page cache in form of a radix tree.

4. The data processing method according to claim 3, wherein the step of managing all of the pages stored in the page cache in form of the radix tree comprises:
    connecting all of the pages in the page cache to a bidirectional chain list.

5. The data processing method according to claim 2, further comprising:
    when the system memory is insufficient, prompting the page cache to release the pages in an appointed quantity, the pages in the appointed quantity being the pages in the appointed quantity from a header of a bidirectional chain list.

6. The data processing method according to claim 5, wherein the step of prompting the page cache to release the pages in the appointed quantity comprises:
    prompting the page cache to delete the pages in the appointed quantity from the bidirectional chain list, and to delete the pages in the appointed quantity from the radix tree.

7. The data processing method according to claim 1, wherein the step of reading the requested data from the external memory comprises:
    when a data amount of the requested data is smaller than the threshold, reading data in an amount of the predetermined threshold including the requested data from the external memory, duplicating the requested data from the read data of the predetermined threshold, and adding the remaining data to the page cache; when the data amount of requested data is greater than the threshold, directly reading and duplicating the requested data from the external memory to the system memory according to the data request.

8. The data processing method according to claim 1, further comprising:
    when the page cache includes the requested data of the data request and the data request is the data writing request, deleting the requested data included in the page cache, and writing the requested data of the data request to an external memory; when the page cache does not include the requested data and the data request is the data writing request, directly writing the requested data to the external memory.

9. A smart device comprising a processor, the processor configured to:
    look up whether a page cache pre-storing a small data file required for booting includes requested data of a data request when the data request is detected in the boot procedure of the smart device, the small data file being a file having a data amount smaller than a predetermined threshold;
    determine whether the data request is a data reading request or a data writing request when the page cache includes the requested data of the data request; and
    duplicate the requested data from the page cache to a system memory according to the data request when it is determined that that the data request is the data reading request,
    wherein when the page cache includes a part of data of the requested data, if the part of data included in the page cache comprises a beginning section of data of the requested data or an ending section of data of the requested data of the data request, the processor is further configured to duplicate the part of data included to the data request, and read a part of data in the requested data not included from an external memory; if the part of data included in the page cache comprises a middle section or fragments of the requested data of the data request, the processor is further configured to directly delete the part of data included in the page cache, and read the requested data from the external memory; when the page cache does not include the requested data and the data request is the data reading request, the processor is further configured to read the requested data from an external memory.

10. The smart device according to claim 9, wherein the processor is further configured to obtain the small data file required for booting and consecutively store the small data file to the page cache.

11. The smart device according to claim 10, wherein the processor is further configured to store the small data file in form of pages into the page cache, and manage all pages stored in the page cache in form of a radix tree.

12. The smart device according to claim 11, wherein the processor is further configured to connect all of the pages in the page cache to a bidirectional chain list.

13. The smart device according to claim 10, wherein the processor is further configured to prompt the pages in an appointed quantity when the system memory is insufficient, wherein the pages in the appointed quantity are the pages in the appointed quantity from a header of a bidirectional chain list.

14. The smart device according to claim 13, wherein the processor is further configured to delete the pages in the appointed quantity from the bidirectional chain list, and delete the pages in the appointed quantity from the radix tree.

15. The smart device according to claim 10, wherein when the page cache includes the requested data of the data request and the data request is the data writing request, the processor is further configured to delete the requested data included in the page cache, and write the requested data of the data request to an external memory; when the page cache does not include the requested data and the data request is the data writing request, the processor is further configured to directly write the requested data to the external memory.

16. The smart device according to claim 9, wherein when a data amount of the requested data is smaller than the threshold, the processor is further configured to read data in an amount of the predetermined threshold including the requested data from the external memory, duplicate the requested data from the read data of the predetermined threshold, and add the remaining data to the page cache; when the data amount of requested data is greater than the threshold, the processor is further configured to directly read and duplicate the requested data from the external memory to the system memory.

* * * * *